(12) United States Patent
Bagchi et al.

(10) Patent No.: US 11,599,558 B1
(45) Date of Patent: Mar. 7, 2023

(54) ENABLING SCRIPTING LANGUAGE COMMANDS TO BACKUP/RESTORE DATABASES

(71) Applicant: EMC Corporation, Hopkinton, MA (US)

(72) Inventors: Krishnendu Bagchi, Bangalore (IN); Manjesh Chikkanayakanahally, Bangalore (IN); Sunil Yadav, Bangalore (IN); Elango Chockalingam, Bangalore (IN); Amarendra Behera, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 922 days.

(21) Appl. No.: 14/692,905

(22) Filed: Apr. 22, 2015

(51) Int. Cl.
*G06F 16/27* (2019.01)
*G06F 11/14* (2006.01)
*G06F 8/30* (2018.01)
*G06F 16/951* (2019.01)
*G06F 16/21* (2019.01)

(52) U.S. Cl.
CPC .............. *G06F 16/275* (2019.01); *G06F 8/31* (2013.01); *G06F 11/1448* (2013.01); *G06F 16/214* (2019.01); *G06F 16/951* (2019.01)

(58) Field of Classification Search
None
See application file for complete search history.

(56) References Cited

U.S. PATENT DOCUMENTS

| | | | | |
|---|---|---|---|---|
| 7,146,387 | B1* | 12/2006 | Russo | G06F 11/1469 |
| 2002/0002561 | A1* | 1/2002 | Higashiura | G06F 11/14 |
| 2005/0149537 | A1* | 7/2005 | Balin | G06F 16/214 |
| 2007/0220308 | A1* | 9/2007 | Yeung | G06F 11/1458 |
| | | | | 714/5.1 |
| 2011/0214058 | A1* | 9/2011 | Duffie | G06F 9/451 |
| | | | | 715/704 |
| 2012/0265726 | A1* | 10/2012 | Padmanabhan | G06F 16/214 |
| | | | | 707/602 |
| 2013/0054533 | A1* | 2/2013 | Hao | G06F 11/14 |
| | | | | 707/649 |
| 2014/0298182 | A1* | 10/2014 | Sadanala | H04L 41/0843 |
| | | | | 715/736 |

OTHER PUBLICATIONS

Havewala, "Back Up a Thousand Databases Using Enterprise Manager Cloud Control 12c," Jan. 2014 (Year: 2014).*

(Continued)

Primary Examiner — Yu Zhao
(74) Attorney, Agent, or Firm — Dergosits & Noah LLP; Todd A. Noah

(57) ABSTRACT

Enabling scripting language commands to backup/restore databases is described. A system outputs, to a user interface, a backup/restore option for a database. The system generates scripting language commands based on a selection of the backup/restore option received from the user interface. The system outputs, to the user interface, the scripting language commands based on the selection of the backup/restore option. The system enables a scripting language system to execute the scripting language commands based on the selection of the backup/restore option.

20 Claims, 6 Drawing Sheets

(56) References Cited

OTHER PUBLICATIONS

Kuhn et al., "RMAN Recipes for Oracle Database," Jan. 2014 (Year: 2014).*
Intego, "Preparing to Back Up Your Files," Year 2012 (Year: 2012).*
Microsoft, "Backup and Restore of SQL Server Databases," Year 2012 (Year: 2012).*
VNX, "DD Boost For Microsoft SQL Server: Demo", Apr. 2, 2014 which is based on the product "DD Boost For Microsoft SQL Server" which was released on 2014, https://www.youtube.com/watch?v=NTIgBZiS6D8 (Year: 2014).*
Devart, "dbForge Studio for SQL Server," 2014 (Year: 2014).*
VNX, "DD Boost For IBM DB2: Demo" (https://www.youtube.com/watch?v=06Ru252llks), May 12, 2014 (Year: 2014).*
APEXSLQ, "How to quickly convert SQL code to language-specific client code," Apr. 3, 2013, (Year: 2013).*
EMC® Data Domain® Boost for Microsoft Applications, Release 1.0, Administration Guide, Rev 05, published Dec. 26, 2014.
EMC® Data Domain® Boost for Enterprise Applications Microsoft Application Agent, Release 2.0, Installation and Administration Guide, Rev 03, published May 2016.

* cited by examiner

US 11,599,558 B1

ENABLING SCRIPTING LANGUAGE COMMANDS TO BACKUP/RESTORE DATABASES

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A data object may be accessed via a scripting language, which is a programming language that supports scripts, programs written for a special run-time environment that can interpret (rather than compile) and automate the execution of tasks that could alternatively be executed one-by-one by a human operator. An example of a programming language that supports scripts is structured query language (SQL), a special-purpose programming language designed for managing data held in a relational database management system.

DETAILED DESCRIPTION

Traditionally, a database administrator schedules backup operations for a data object accessed via a scripting language by using an agent or a task scheduler that is accessed via a system other than the scripting language system. For example, a database administrator schedules a backup operation for a SQL database by using an agent for the SQL system or a Windows® task scheduler, but not the SQL system itself. Typically, a database administrator needs to generate scripts to perform maintenance on a database accessed via a scripting language in preparation for backing up the database, and then separately perform a database backup, because traditional backup/restore applications do not support using such script commands to back up such a database. For example, a database administrator may enter SQL script commands in a SQL query window to delete database rows during maintenance that is required in preparation for a backup of a SQL database, but then the database administrator has to exit the SQL query window to request a backup/restore application to create a backup of the revised SQL database because the backup/restore application does not support SQL script commands. Such a procedure is inefficient and may result in creating problems due to human errors during the multiple steps required for the transition between the different systems.

Embodiments herein enable scripting language commands to backup/restore databases. A backup/restore option for a database is output to a user interface. Scripting language commands are generated based on a selection of the backup/restore option received from the user interface. These newly generated scripting language commands are output to a user interface. A scripting language system is enabled to execute the newly generated scripting language commands.

For example, a backup/restore application outputs options for a user to back up or restore a structured query language database. The backup/restore application generates structured query language commands to back up the structured query language database based on a user selecting the backup options for the structured query language database. The backup/restore application outputs these structured query language commands to back up the structured query language database to the user. A plug-in provided by the backup/restore application enables a structured query language system to execute this structured query language commands to back up the structured query language database. Database administrators no longer have to exit a scripting language system to backup or restore a database accessed via scripting language commands because the backup/restore application enables scripting language commands to backup and restore such a database.

Figure 1:
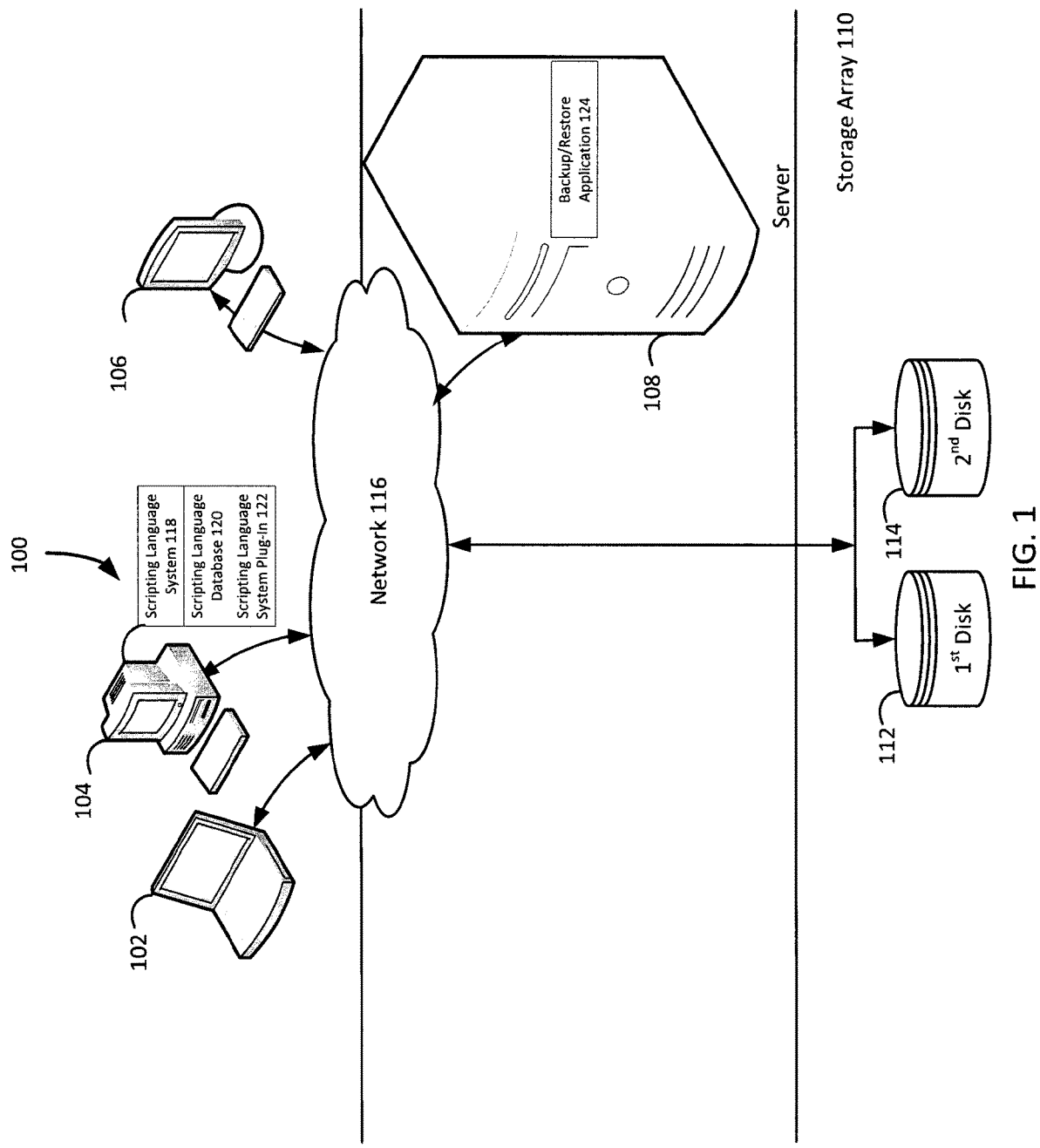
FIG. 1 illustrates a block diagram of an example system for enabling scripting language commands to backup/restore databases, under an embodiment.

FIG. 1 illustrates a block diagram of a system that implements enabling scripting language commands to backup/restore databases, under an embodiment. As shown in FIG. 1, a system 100 may illustrate a cloud computing environment in which data, applications, services, and other resources are stored and delivered through shared datacenters and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108 and a storage array 110 that may be provided by a hosting company. Although FIG. 1 depicts the first client 102 as a laptop 102, the second client 104 as a personal computer 104, and the third client 106 as an iMac® 106, each of the clients 102-106 may be any type of computer, such as a server. The storage array 110 includes a first disk 112 and a second disk 114. The clients 102-106, the server 108, and the storage array 110 communicate via a network 116. Although FIG. 1 depicts the system 100 with three clients 102-106, one server 108, one storage array 110, two disks 112-114, and one network 116, the system 100 may include any number of clients 102-106, any number of servers 108, any number of storage arrays 110, any number of disks 112-114, and any number of networks 116. The clients 102-106 and the server 108 may each be substantially similar to the system 600 depicted in FIG. 6 and described below.

The second client 104 includes a scripting language system 118 and a scripting language database 120. The second client 104 also includes a scripting language plug-in 122 provided by a backup/restore application 124, which resides on the server 108. Although the scripting language system 118 may be referred to as the structured query language system 118, the scripting language database 120 may be referred to as the structured query language database 120, and the scripting language plug-in 122 may be referred to as the structured query language plug-in 122, these system components 118-122 may be based on any type of relational database management system and accessed via any type of scripting language commands. Furthermore, the scripting language database 120 may reside on either of the clients 102 or 106 other than the client 104 where the scripting language system 118 and the scripting language plug-in 122 reside.

FIG. 1 depicts the backup/restore application 124 residing completely on the server 108, but the backup/restore application 124 may reside completely on the clients 102-106, or in any combination of partially on the server 108 and partially on the clients 102-106. Although the following paragraphs describe EMC Corporation's NetWorker® backup/restore application, EMC Corporation's Avamar® backup/restore application, and EMC Corporation's Data Domain® backup/restore application as examples of the backup/restore application 124, the backup/restore application 124 may be any other backup/restore application which provides the backup/restore functionalities described in the Background section.

The backup/restore application 124 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 124 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 124 may be may be an EMC Corporation's Data Domain® backup/restore application. Direct client communication with shared storage may be a preferred method, but is not always feasible if the shared storage is isolated from the clients, which is often the case due to isolation concerns arising out of security issues or physical requirements. Some backup/restore applications provide a mechanism for clients to access shared storage through a central aggregation point, referred to as a storage node. In such systems, remote clients connect to the storage node that reads and writes, in order, data to the shared storage on their behalf. This type of system, however, may create a bottleneck since clients are forced to communicate with a specific pre-determined single storage node to read/write data to the target storage device. Moreover, since read/write operations are handled sequentially, concurrent operations are limited or impractical, as are parallel restoration operations. Therefore, the system 100 may represent a storage system that utilizes deduplication methods, such as the EMC Corporation's Data Domain® deduplication storage system. In general, deduplication systems send only deduplicated and compressed data across the network, thus requiring only a fraction of the bandwidth, time, and cost compared to traditional replication methods. A Data Domain® storage device is typically put on a primary network so that all clients 102-106 can access the shared or batched storage array 110. For isolation and security reasons, the clients 102-106 of the system 100 are not directly coupled to the storage array 110, but rather access the storage array 110 through respective storage nodes, which are not depicted in FIG. 1, that act as a gateway to the storage array 110.

Figure 3:
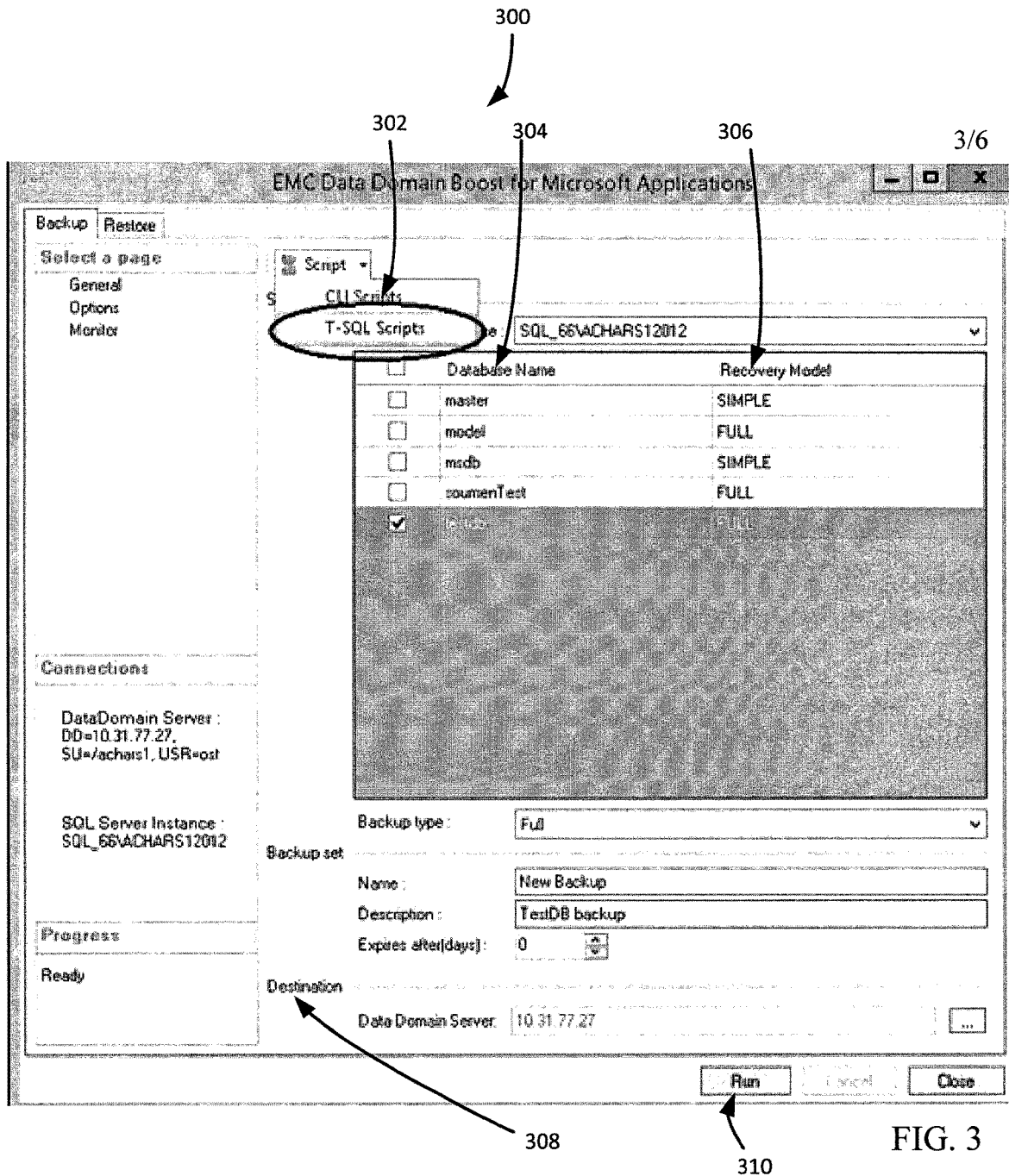
FIG. 3 is a screen shot illustrating a frame of an example user interface screen of a display device for enabling scripting language commands to backup/restore databases, under an embodiment.

After the backup/restore application 124 registers the structured query language system plug-in 122 with the structured query language system 118, the backup/restore application 124 can receive a request to output backup/restore options for a database from a user interface. For example, a database administrator uses the personal computer 104 to request the options to back up or restore the structured query language database 120, and the request is received by the backup/restore application 124. Having received any request for backup/restore options for a database, the backup/restore application 124 outputs the backup/restore options for the database to a user interface. For example, the backup/restore application 124 outputs options to back up or restore the structured query language database 120 to the requesting database administrator via the personal computer 104. A screen shot illustrating a frame of example options to back up or restore a scripting language database is depicted in FIG. 3 and described below in the description of FIG. 3.

Having output backup/restore options, the backup/restore application 124 can receive selections of backup/restore options from a user interface. For example, the database administrator uses the personal computer 104 to request a backup of the structured query language database 120, and the request is received by the backup/restore application 124. A screen shot illustrating a frame of example user selections to back up a scripting language database is depicted in FIG. 3 and described below in the description of FIG. 3.

Figure 4:
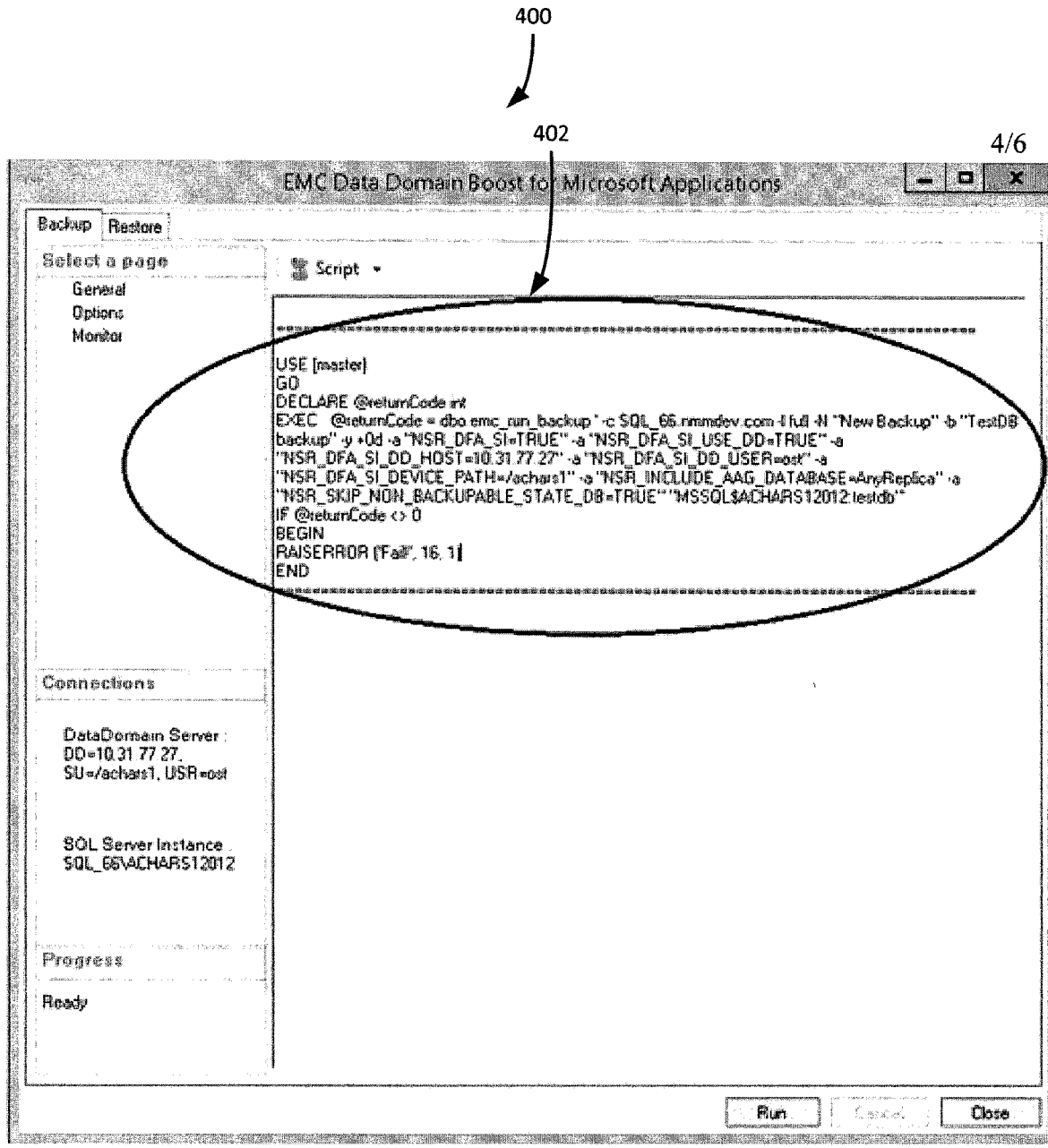
FIG. 4 is a screen shot illustrating a frame of another example user interface screen of a display device for enabling scripting language commands to backup/restore databases, under an embodiment.

Having received any selections of backup/restore options, the backup/restore application 124 generates scripting language commands based on the selections of backup/restore options received from a user interface. For example, the backup/restore application 124 generates structured query language commands to back up the structured query language database 120 based on selections of the backup options, such as the backup source, the backup destination, and the backup type, received from the database administrator via the personal computer 104. The backup/restore application 124 modifies custom native scripts to provide key backup/restore parameters in the native custom scripts, such as the backup source, the backup destination, and the backup type. A screen shot illustrating a frame of example scripting language commands based on selections of backup/restore options is depicted in FIG. 4 and described below in the description of FIG. 4.

Having generated scripting language commands based on selections of backup/restore options, the backup/restore application 124 outputs the scripting language commands based on the selections of the backup/restore options to a user interface. For example, the backup/restore application 124 outputs the structured query language commands to back up the structured query language database 120 to the database administrator via the personal computer 104. A screen shot illustrating a frame outputting example scripting language commands based on selections of backup/restore options is depicted in FIG. 4 and described below in the description of FIG. 4.

Having output scripting language commands based on selections of backup/restore options, the backup/restore application 124 enables a scripting language system to execute the scripting language commands based on the selections of the backup/restore options. For example, after the database administrator copies the structured query language commands to back up the structured query language database 120 and pastes these structured query language commands into a structured query language query window, the structured query language plug-in 122 provided by the backup/restore application 124 enables the structured query language system 118 to execute the structured query language commands to back up the structured query language database 120.

Figure 5:
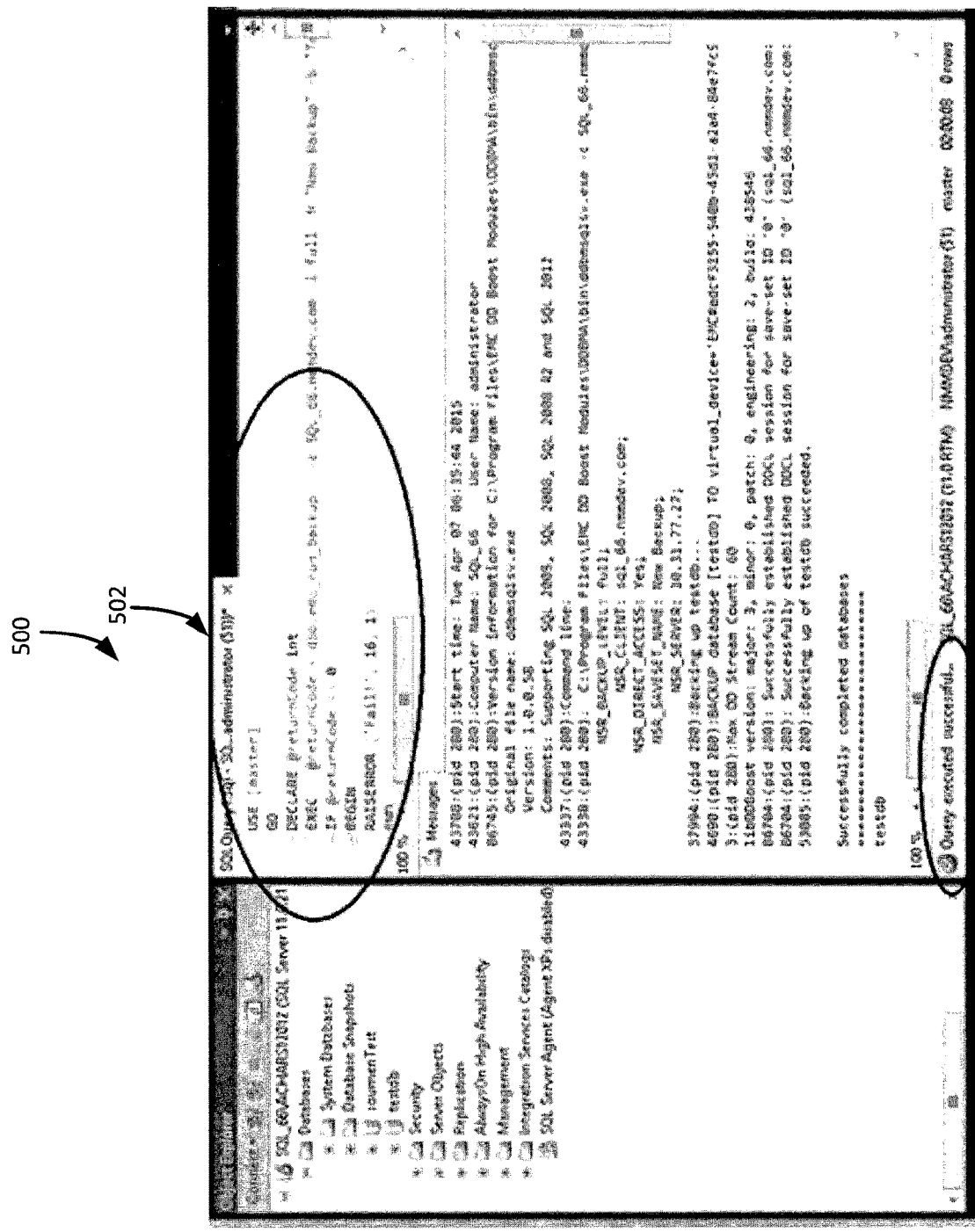
FIG. 5 is a screen shot illustrating a frame of yet another example user interface screen of a display device for enabling scripting language commands to backup/restore databases, under an embodiment.

The structured query language plug-in 122 enables the scripting language system 118 to read backup/restore parameters, such as the backup source, the backup destination, and the backup type, from the custom native scripts, and use these backup/restore parameters as input parameters which are recognized by the backup/restore application 124. The backup/restore application 124 parses the custom native scripts and maps the backup/restore parameters to the functionality supported by the backup/restore application 124. Consequently, when new functionality is added to the backup/restore application 124, the custom native scripts do not need to be modified. A screen shot illustrating a frame of a scripting language system executing scripting language commands based on selections of backup/restore options is depicted in FIG. 5 and described below in the description of FIG. 5. Database administrators no longer have to exit the scripting language system 118 to backup or restore the scripting language database 120 because the backup/restore application 124 enables scripting language commands to backup and restore the scripting language database 120.

Furthermore, the backup/restore application 124 may enable scripting language commands to backup and restore the scripting language database 120 on many occasions through a single instance of generating scripting language commands, due to the reusable and repeatable nature of the scripting language commands. For example, a database administrator may generate scripting language commands in a scripting language query window to determine when a database accessed by scripting language commands has stored data that exceeds 60% of the database's current capacity, and may want to back up the database whenever such a condition occurs. Rather than exiting the scripting language system 118 whenever the scripting language commands determine that the scripting language database 120 exceeds 60% of the database capacity and then request a backup of the scripting language database 118, the database administrator can request for the backup/restore application 124 to output backup options for the scripting language database 118.

The backup/restore application 124 generates the appropriate scripting language commands based on the selections by the database administrator, then the database administrator copies and pastes these scripting language commands into the scripting language query window with the scripting language commands that determine when 60% of the capacity of the scripting language database 118 has been exceeded. Every time that the scripting language database 118 exceeds 60% of the database capacity, the combination of the scripting language commands generated by the database administrator and the scripting language commands generated by the backup/restore application 124 will automatically execute to back up the scripting language database 118, without any further intervention by the database administrator.

Figure 2:
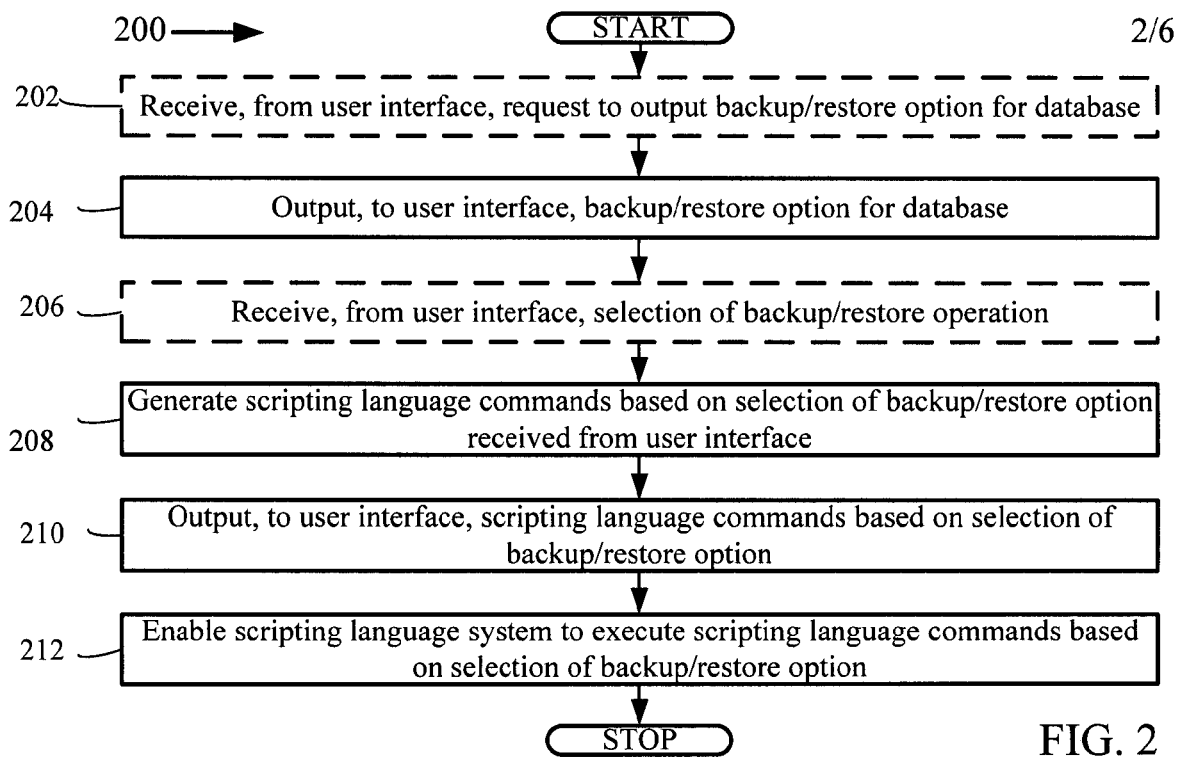
FIG. 2 is a flowchart that illustrates a method of enabling scripting language commands to backup/restore databases, under an embodiment.

FIG. 2 is a flowchart that illustrates a method for enabling scripting language commands to backup/restore databases, under an embodiment. Flowchart 200 illustrates method acts illustrated as flowchart blocks for certain steps involved in and/or between the clients 102-106 and/or the server 108 of FIG. 1.

A request to output a backup/restore option for a database is optionally received from a user interface, block 202. For example, a database administrator uses the personal computer 104 to request options to back up or restore the structured query language database 120, and the request is received by the backup/restore application 124. Having optionally received a request for backup/restore options for a database, the backup/restore options for the database are output to a user interface, block 204. For example, the backup/restore application 124 outputs options to back up or restore the structured query language database 120 to the personal computer 104, Having output backup/restore options for a database, selections of the backup/restore options are optionally received from a user interface, block 206. For example, the database administrator uses the personal computer 104 to request a backup of the structured query language database 120, and the request is received by the backup/restore application 124. Having optionally received selections of backup/restore options, scripting language commands are generated based on the selections of the backup/restore options received from a user interface, block 208. For example, the backup/restore application 124 generates structured query language commands to back up the structured query language database 120 based on selections of the backup options received from the personal computer 104.

Having generated scripting language commands based on selections of backup/restore options, the scripting language commands based on the selection of the backup/restore options are output to a user interface, block 210. For example, the backup/restore application 124 outputs the structured query language commands to back up the structured query language database 120 to the personal computer 104. Having output scripting language commands based on selections of backup/restore options, a scripting language system is enabled to execute the scripting language commands based on the selections of a backup/restore options, block 212. For example, the structured query language plug-in 122 provided by the backup/restore application 124 enables the structured query language system 118 to execute the structured query language commands to back up the structured query language database 120.

Although FIG. 2 depicts the blocks 202-212 occurring in a specific order, the blocks 202-212 may occur in another order. In other implementations, each of the blocks 202-212 may also be executed in combination with other blocks and/or some blocks may be divided into a different set of blocks.

FIG. 3 is a screen shot illustrating a frame 300 of an example user interface screen of a display device for enabling scripting language commands to backup/restore databases, under an embodiment. The frame 300 includes a T-SQL Scripts option 302 that may be selected by a user. After the user selects the T-SQL Scripts option 302, the backup/restore application 124 prompts the user with a database name 304 option, a recovery model 306 option, and a destination option 308. If the user selects the database name 304 option, the backup/restore application 124 enables the user to select the source database for a backup, such as "testdb." If the user selects the recovery model 306 option, the backup/restore application 124 enables the user to select the type of backup, such as simple or full. If the user selects the destination 308 option, the backup/restore application 124 enables the user to select the destination for the backup of the database, such as a Data Domain® server. When the user is finished entering selections for backup/restore options, the user may select a run 310 option to request the backup/restore application 124 to generate scripting language commands based on the selections that the user entered. Although the frame 300 depicts options 302-310 for backing up a database, the frame 300 may include similar options for restoring a database.

FIG. 4 is a screen shot illustrating a frame 400 of an example user interface screen of a display device for enabling scripting language commands to backup/restore databases, under an embodiment. The frame 400 includes example scripting language commands 402 that the backup/restore application 124 generates based on selections of backup/restore options for a database and then outputs to a user interface. Although the frame 400 depicts example scripting language commands 402 for backing up a database, the frame 400 may include similar example scripting language commands for restoring a database.

FIG. 5 is a screen shot illustrating a frame 500 of an example user interface screen of a display device for enabling scripting language commands to backup/restore databases, under an embodiment. The frame 500 is displayed by the scripting language system 118 which enables a database administrator to enter scripting language commands. The frame 500 includes example scripting language commands 502 that the backup/restore application 124 generated based on selections of backup/restore options for a database and then output to a user interface for a user to copy and paste into the frame 500. The frame 500 also includes an execution result 504, such as "query executed successful," which may indicate that the plug-in 122 provided by the backup/restore application 124 enabled the structured query language system 118 to execute the structured query language script to back up the structured query language database 120. Although the frame 500 depicts example scripting language commands 502 for backing up a database, the frame 500 may include similar example scripting language commands for restoring a database.

The frames 300, 400, and 500 may be part of a larger display screen that includes fields for users to enter commands to create, retrieve, edit, store, backup, and restore data objects. The database system may output a display screen that includes the frames 300, 400, and 500 in response to searches based on search criteria input via a user interface. Because the frames 300, 400, and 500 are samples, the frames 300, 400, and 500 could vary greatly in appearance. For example, the relative sizes and positioning of the text is not important to the practice of the present disclosure. The frames 300, 400, and 500 can be depicted by any visual display, but are preferably depicted by a computer screen. The frames 300, 400, and 500 could also be output as reports and printed or saved in electronic format, such as PDF. The frames 300, 400, and 500 can be part of a personal computer system and/or a network, and operated from system data received by the network, and/or on the Internet. The frames 300, 400, and 500 may be navigable by a user. Typically, a user can employ a touch screen input or a mouse input device to point-and-click to a location on the frames 300, 400, and 500 to manage the text on the frames 300, 400, and 500, such as a selection that enables a user to edit the text. Alternately, a user can employ directional indicators, or other input devices such as a keyboard. The text depicted by the frames 300, 400, and 500 are examples, as the frames 300, 400, and 500 may include a much greater amount of text. The frames 300, 400, and 500 may also include fields in which a user can input textual information.

Figure 6:
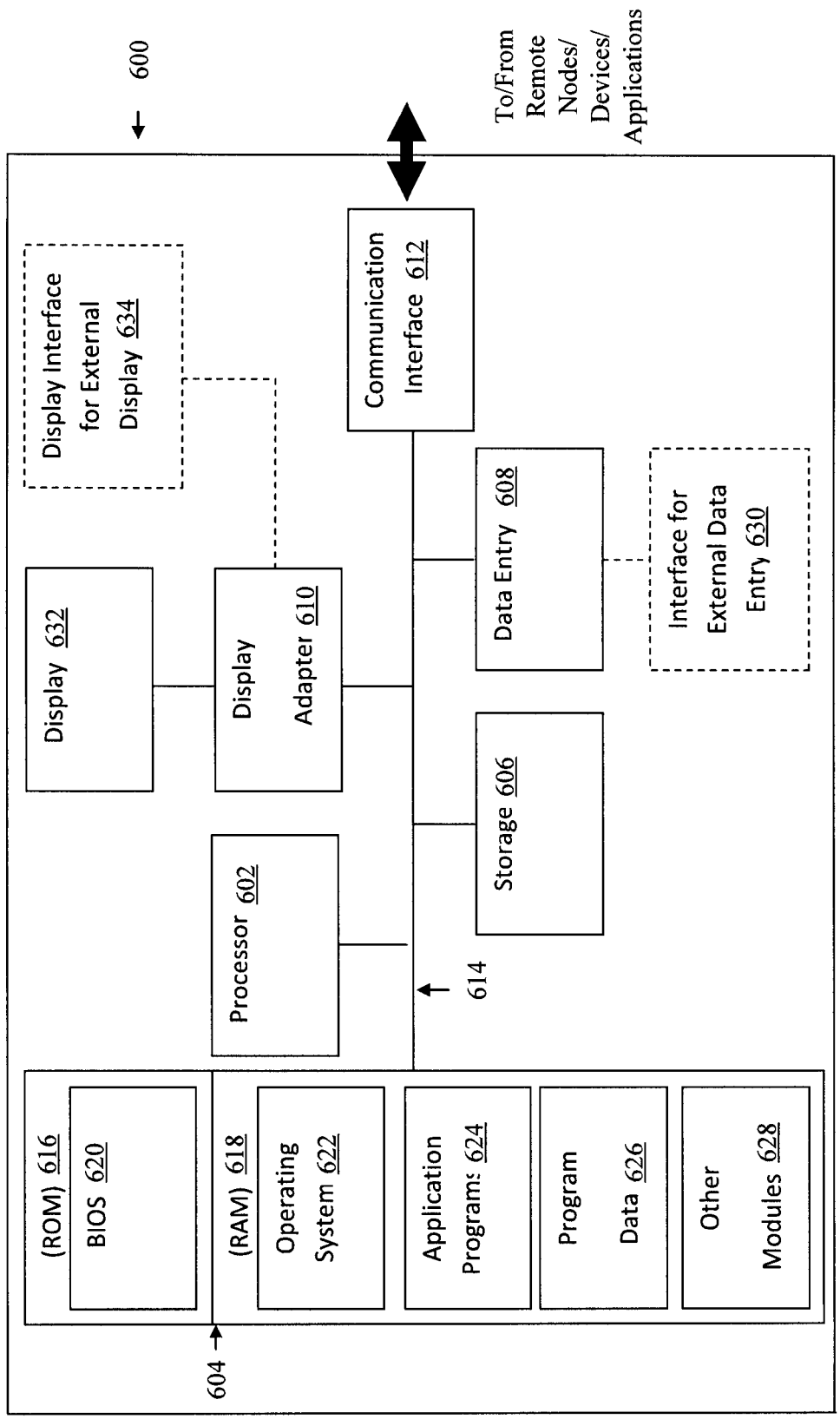
FIG. 6 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 6 may vary depending on the system implementation. With reference to FIG. 6, an exemplary system for implementing the subject matter disclosed herein includes a hardware device 600, including a processing unit 602, memory 604, storage 606, a data entry module 608, a display adapter 610, a communication interface 612, and a bus 614 that couples the elements 604-612 to the processing unit 602.

The bus 614 may comprise any type of bus architecture. Examples include a memory bus, a peripheral bus, a local bus, etc. The processing unit 602 is an instruction execution machine, apparatus, or device and may comprise a microprocessor, a digital signal processor, a graphics processing unit, an application specific integrated circuit (ASIC), a field programmable gate array (FPGA), etc. The processing unit 602 may be configured to execute program instructions stored in the memory 604 and/or the storage 606 and/or received via the data entry module 608.

The memory 604 may include read only memory (ROM) 616 and random access memory (RAM) 618. The memory 604 may be configured to store program instructions and data during operation of the hardware device 600. In various embodiments, the memory 604 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 604 may also include nonvolatile memory technologies such as nonvolatile flash RAM (NVRAM) or ROM. In some embodiments, it is contemplated that the memory 604 may include a combination of technologies such as the foregoing, as well as other technologies not specifically mentioned. When the subject matter is implemented in a computer system, a basic input/output system (BIOS) 620, containing the basic routines that help to transfer information between elements within the computer system, such as during start-up, is stored in the ROM 616.

The storage 606 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 600.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 606, the ROM 616 or the RAM 618, including an operating system 622, one or more applications programs 624, program data 626, and other program modules 628. A user may enter commands and information into the hardware device 600 through the data entry module 608. The data entry module 608 may include mechanisms such as a keyboard, a touch screen, a pointing device, etc. Other external input devices (not shown) are connected to the hardware device 600 via an external data entry interface 630. By way of example and not limitation, external input devices may include a microphone, joystick, game pad, satellite dish, scanner, or the like. In some embodiments, external input devices may include video or audio input devices such as a video camera, a still camera, etc. The data entry module 608 may be configured to receive input from one or more users of the hardware device 600 and to deliver such input to the processing unit 602 and/or the memory 604 via the bus 614.

A display 632 is also connected to the bus 614 via the display adapter 610. The display 632 may be configured to display output of the hardware device 600 to one or more users. In some embodiments, a given device such as a touch screen, for example, may function as both the data entry module 608 and the display 632. External display devices may also be connected to the bus 614 via an external display interface 634. Other peripheral output devices, not shown, such as speakers and printers, may be connected to the hardware device 600.

The hardware device 600 may operate in a networked environment using logical connections to one or more remote nodes (not shown) via the communication interface 612. The remote node may be another computer, a server, a router, a peer device or other common network node, and typically includes many or all of the elements described above relative to the hardware device 600. The communication interface 612 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 612 may include logic configured to support direct memory access (DMA) transfers between the memory 604 and other devices.

In a networked environment, program modules depicted relative to the hardware device 600, or portions thereof, may be stored in a remote storage device, such as, for example, on a server. It will be appreciated that other hardware and/or software to establish a communications link between the hardware device 600 and other devices may be used.

It should be understood that the arrangement of the hardware device 600 illustrated in FIG. 6 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 600.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 6.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for enabling scripting language commands to backup/restore databases, the system comprising:
   one or more processors; and
   a processor-based backup/restore application having backup/restore commands that trigger backup or restore functionality supported by the backup/restore application, which when executed, will cause the one or more processors to:
   output, by the backup/restore application, backup/restore options for a database to a user interface associated with the backup/restore application, the backup/restore options including selectable backup/restore parameters for at least one of recovery model for a database backup or a destination for the database backup;
   generate, by the backup/restore application, scripting language commands by:
      parsing custom native script commands of a relational database management system, the custom native script commands being of a database-specific language that are different from the backup/restore commands used by the backup/restore application, which does not support script commands of the relational database management system,
      mapping the custom native script commands to the backup or restore functionality supported by the backup/restore application, and
      modifying the custom native script commands to include at least one of the backup/restore parameters, the at least one of the backup/restore parameters being selected from the user interface associated with the backup/restore application,
   output, by the backup/restore application, the modified custom native script commands including the at least one backup/restore parameter generated by the backup/restore application to the user interface associated with the backup/restore application;
   execute, by the backup/restore application, the backup or restore functionality by:
      receiving, by a plug-in provided by the backup/restore application, the at least one backup/restore parameter from the relational database management system in response to the relational database management system executing the modified custom native script commands including the at least one backup/restore parameter, the execution of the generated scripting language commands causing back up of the database by parsing the modified custom native scripts to identify the backup/restore parameters, and mapping the backup/restore parameters to the backup or restore functionality supported by the backup/restore application; and
      receiving, by the backup/restore application, data via the plug-in when the relational database management system subsequently re-executes the modified custom native script commands including the at least one backup/restore parameter.

2. The system of claim 1, wherein the processor-based application further causes the processor to receive, from the user interface, a request to output the backup/restore option for the database.

3. The system of claim 1, wherein the processor-based application further causes the processor to receive, from the user interface, the selection of the backup/restore option.

4. The system of claim 1, wherein a backup/restore application outputs, to the user interface, the backup/restore option for the database and the scripting language commands based on the selection of the backup/restore option.

5. The system of claim 1, wherein the scripting language commands comprise a structured query language script and the relational database management system comprises a structured query language system.

6. The system of claim 1, wherein enabling the relational database management system to execute the scripting language commands based on the selection of the backup/restore option comprises enabling the backup/restore option for the database.

7. The system of claim 1, wherein selection of the backup/restore option comprises: selection of a parameter for the backup/restore option, the parameter comprising one of:
- (i) an identification of a database;
- (ii) an identification of a server; and
- (iii) a database recovery model type, wherein the database recovery model type comprises one of: a simple database recovery model and a full database recovery model.

8. The system of claim 7, wherein generate, by the backup/restore application, scripting language commands based on the selection of the backup/restore option received from the user interface comprises:
generate scripting language commands with respect to a select database condition comprising a threshold capacity of the database being exceeded, wherein the selection of the backup/restore option includes a respective parameter comprising an identification of a select database; and
wherein enable, by the backup/restore application, the plug-in for the relational database management system to subsequently re-execute the scripting language commands comprises:
enable the plug-in to automatically re-execute the scripting language commands upon recurrence of the threshold capacity of the select database being exceeded.

9. A computer-implemented method for enabling scripting language commands to backup/restore databases, the method comprising:
outputting, by the backup/restore application, backup/restore options for a database to a user interface associated with the backup/restore application, the backup/restore application having backup/restore commands that trigger backup or restore functionality supported by the backup/restore application, the backup/restore options including selectable backup/restore parameters for at least one of recovery model for a database backup or a destination for the database backup;
generating, by the backup/restore application, scripting language commands by:
parsing custom native script commands of a relational database management system, the custom native script commands being of a database-specific language that are different from the backup/restore commands used by the backup/restore application, which does not support script commands of the relational database management system,
mapping the custom native script commands to the backup or restore functionality supported by the backup/restore application, and
modifying the custom native script commands to include at least one of the backup/restore parameters, the at least one of the backup/restore parameters being selected from the user interface associated with the backup/restore application,
outputting, by the backup/restore application, the modified custom native script commands including the at least one backup/restore parameter generated by the backup/restore application to the user interface associated with the backup/restore application;
executing, by the backup/restore application, the backup or restore functionality by:
receiving, by a plug-in provided by the backup/restore application, the at least one backup/restore parameter from the relational database management system in response to the relational database management system executing the modified custom native script commands including the at least one backup/restore parameter, the execution of the generated scripting language commands causing back up of the database by parsing the modified custom native scripts to identify the backup/restore parameters, and mapping the backup/restore parameters to the backup or restore functionality supported by the backup/restore application; and
receiving, by the backup/restore application, data via the plug-in when the relational database management system subsequently re-executes the modified custom native script commands including the at least one backup/restore parameter.

10. The method of claim 9, wherein the method further comprises receiving, from the user interface, a request to output the backup/restore option for the database.

11. The method of claim 9, wherein the method further comprises receiving, from the user interface, the selection of the backup/restore option.

12. The method of claim 9, wherein a backup/restore application outputs, to the user interface, the backup/restore option for the database and the scripting language commands based on the selection of the backup/restore option.

13. The method of claim 9, wherein the scripting language commands comprise a structured query language script and the relational database management system comprises a structured query language system.

14. The method of claim 9, wherein enabling the relational database management system to execute the scripting language commands based on the selection of the backup/restore option comprises enabling the backup/restore option for the database.

15. A computer program product, comprising a non-transitory computer-readable medium having a computer-readable program code embodied therein to be executed by one or more processors, the program code including instructions to:
output, by the backup/restore application, backup/restore options for a database to a user interface associated with the backup/restore application, the backup/restore application having backup/restore commands that trigger backup or restore functionality supported by the backup/restore application, the backup/restore options including selectable backup/restore parameters for at least one of recovery model for a database backup or a destination for the database backup;
generate, by the backup/restore application, scripting language commands by:
parsing custom native script commands of a relational database management system, the custom native script commands being of a database-specific language that are different from the backup/restore commands used by the backup/restore application, which does not support script commands of the relational database management system;
mapping the custom native script commands to the backup or restore functionality supported by the backup/restore application; and
modifying the custom native script commands to include at least one of the backup/restore parameters, the at least one of the backup/restore parameters being selected from the user interface associated with the backup/restore application;
output, by the backup/restore application, the modified custom native script commands including the at least one backup/restore parameter generated by the backup/restore application to the user interface associated with the backup/restore application;

execute, by the backup/restore application, the backup or restore functionality by:
  receiving, by a plug-in provided by the backup/restore application, the at least one backup/restore parameter from the relational database management system in response to the relational database management system executing the modified custom native script commands including the at least one backup/restore parameter, the execution of the generated scripting language commands causing back up of the database by parsing the modified custom native scripts to identify the backup/restore parameters, and mapping the backup/restore parameters to the backup or restore functionality supported by the backup/restore application; and
  receiving, by the backup/restore application, data via the plug-in when the relational database management system subsequently re-executes the modified custom native script commands including the at least one backup/restore parameter.

16. The computer program product of claim 15, wherein the program code further includes instructions to receive, from the user interface, a request to output the backup/restore option for the database.

17. The computer program product of claim 15, wherein the program code further includes instructions to receive, from the user interface, the selection of the backup/restore option.

18. The computer program product of claim 15, wherein a backup/restore application outputs, to the user interface, the backup/restore option for the database and the scripting language commands based on the selection of the backup/restore option.

19. The computer program product of claim 15, wherein the scripting language commands comprise a structured query language script and the relational database management system comprises a structured query language system.

20. The computer program product of claim 15, wherein enabling the relational database management system to execute the scripting language commands based on the selection of the backup/restore option comprises enabling the backup/restore option for the database.

* * * * *